UNITED STATES PATENT OFFICE.

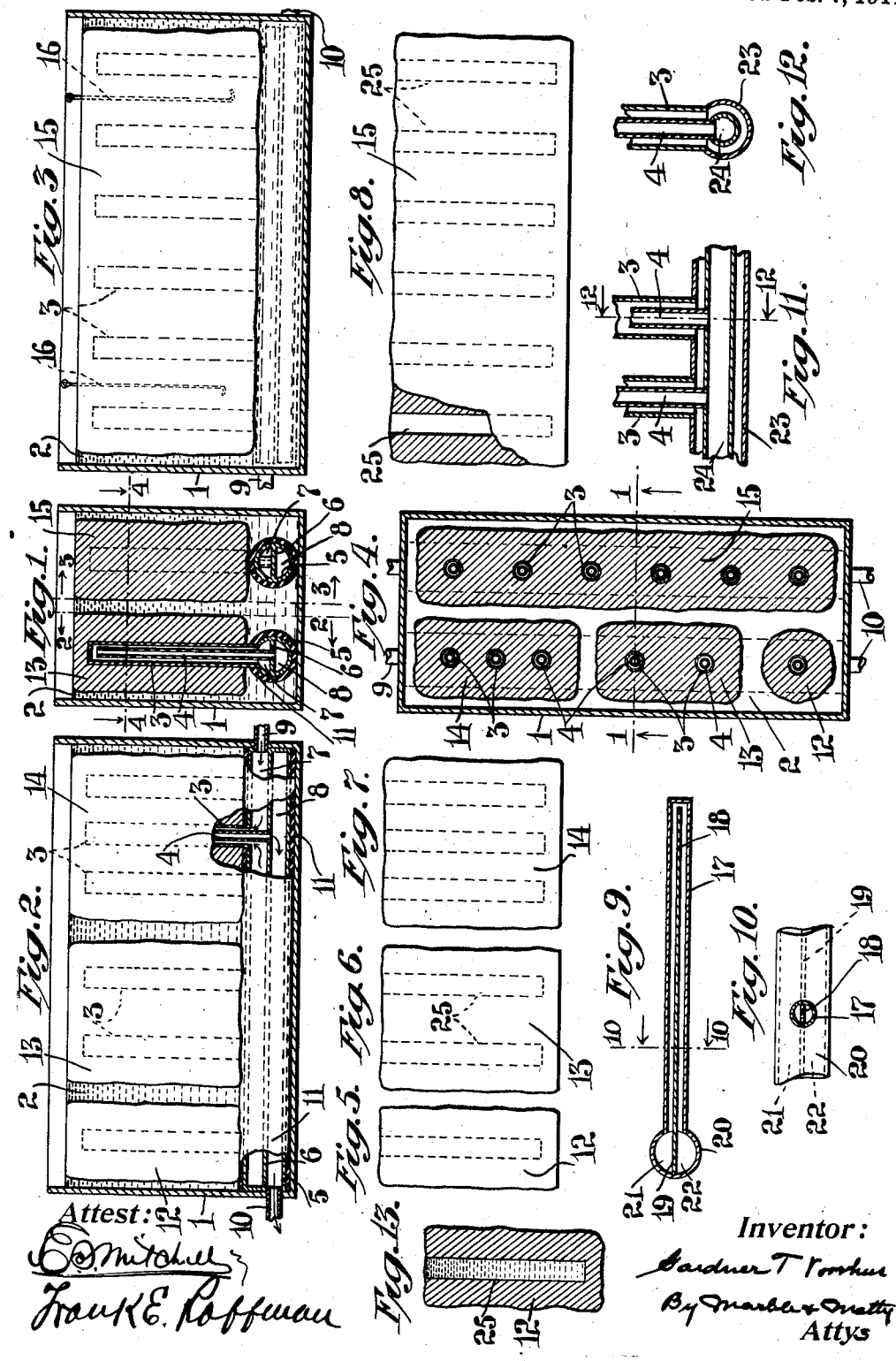

GARDNER T. VOORHEES, OF BOSTON, MASSACHUSETTS, ASSIGNOR TO WILLIAM H. LLEWELLYN, OF NEW YORK, N. Y.

APPARATUS FOR ICE-MAKING.

983,466.

Specification of Letters Patent.

Patented Feb. 7, 1911.

Application filed February 5, 1904. Serial No. 192,257.

*To all whom it may concern:*

Be it known that I, GARDNER T. VOORHEES, a citizen of the United States, and a resident of Boston, Suffolk county, Massachusetts, have invented a certain new and useful Apparatus for Ice-Making, of which the following is a specification.

My invention relates to improvements in apparatus for making ice, and involves the freezing of water outwardly from a plurality of elements, the freezing taking place in all directions normal to the wetted surface of the freezing elements.

In the accompanying drawings; Figure 1 shows a transverse section of an ice making tank having within it a plurality of freezing elements with means for supplying a refrigerating agent thereto, and conducting it away therefrom, this section being taken on the line 1—1 of Fig. 4; Fig. 2 shows a longitudinal section of said tank, the section being taken on the line 2—2 of Fig. 1, a portion of one of the freezing elements and portions of the header therefor being sectioned; Fig. 3 shows a similar longitudinal section taken on the line 3—3 of Fig. 1; Fig. 4 shows a horizontal section of the tank and contained apparatus, and ice cakes in process of formation, the section being taken on the line 4—4 of Fig. 1; Figs. 5, 6, 7 and 8 show elevation and inverted different sizes of ice cakes, such as may be formed in the tank illustrated in Figs. 1-4 inclusive, by means of the freezing elements there shown; a portion of one of said cakes being shown in section; Fig. 9 shows a detail longitudinal section of an alternative form of freezing element and header therefor; and Fig. 10 shows a transverse section of this freezing element, and a fragmentary top view of its header. Figs. 11 and 12 show respectively, a detail fragmentary vertical longitudinal section and a detail fragmentary vertical transverse section of a further alternative form of freezing element and header; Fig. 13 shows a transverse section of an ice cake, illustrating the forming of ice to fill an imprint therein.

In Figs. 1-4 inclusive, 1 designates the freezing tank, and 2 a body of water therein from which the ice is being formed. 3, 3 designate the outer pipes of the freezing elements shown, and 4, 4 the inner pipes of such elements. 5 designates a header for the supply and carrying off of the refrigerating agent and the heating agent used, this header being divided longitudinally by a partition 6 into two conduits 7 and 8, of which either may be the supply conduit and the other the return conduit, according to the direction in which the refrigerating agent and heating agent are circulated, though ordinarily 7 will be the supply conduit and 8 the return conduit. The refrigerating agent may be any agent customarily used for ice freezing, for example, brine cooled by suitable means not here shown, ammonia, etc. 9 and 10 designate respectively connections whereby the said header may be connected to the sources of supply of the refrigerating agent and heating agent.

As shown in the drawings, the outer tube 3 of each freezing element is closed at the top, and at the bottom connects with conduit 7, the inner pipe 4 being open at the top for communication with the outer pipe 3, and open at the bottom into communication with conduit 8, there being therefore within pipe 3 an annular space surrounding pipe 4. Circulation is either from conduit 7 up through this annular space and down through pipe 4 into conduit 8, or the reverse, according to the direction in which the refrigerating agent or heating agent is circulated.

In freezing ice by the apparatus shown, as the refrigerating agent is circulating through the freezing elements in the manner described, ice forms normally from the wetted surface of the freezing element, forming not only on the side of such elements but also to some extent from the top, provided the top be immersed in the water as shown in Fig. 1. In the construction shown, ice forms very little downward from the freezing element owing to the heat insulation 11 surrounding the header 5. Whether the ice forms in single cakes about the several freezing elements or forms in a single cake inclosing a plurality of such elements, depends upon the spacing of the several freezing elements from each other. In the first instance of course, ice forms separately about each freezing element, but if these elements be close together the ice surrounding these elements will soon coalesce into a single cake; and after this has occurred freezing will go on from the surface of the combination cake so formed.

In Figs. 1-4 inclusive I have shown one freezing element so spaced apart from the others, and the sides of the tank, to form an individual cake 12; I have shown two other freezing elements so located relatively that the cake 13 formed will be of double length; I have shown three other freezing elements so spaced relatively that the cake 14 formed will be of triple length; and I have shown a number of other elements so spaced relatively as to form a single cake 15 of length comparable to the cakes formed in plate processes. Of course if the freezing were continued indefinitely the cakes 12, 13, 14 and 15 would eventually coalesce and freeze to the sides of the tank, but the process is not allowed to continue so far.

After the cakes have been formed as above described, they are commonly thawed from frozen contact with their freezing elements, by circulating a heating fluid through such freezing elements, for example, warm brine. The cakes are then lifted out of the tank. To facilitate this I sometimes freeze into the cakes rods 16 with eyes at their upper ends with which hooks may be engaged to lift the cakes out readily. The cakes having been removed the process is recommenced. That the ice cakes are freed from their freezing elements is indicated by the fact that when freed they rise somewhat of themselves, floating in the water in the tank.

In the alternative form of freezing element, shown in Figs. 9 and 10, each freezing element consists of a pipe 17 divided longitudinally by a partition 18 which extends downward to a longitudinal partition 19 extending longitudinally of the header 20, said header being therefore divided into two conduits 21 and 22. In the further alternative construction shown in Figs. 11 and 12, the freezing elements comprising annular pipes 3 and 4, as shown in Figs. 1-4 inclusive, but the header, here numbered 23, has within it an internal pipe 24, the bore of this pipe constituting one conduit of the header and the annular space between said pipe and the header constituting the other conduit. When it is desired that the final cake shall not contain the imprints of the freezing elements, these imprints, 25, are filled with water, as indicated in Fig. 13, and the water allowed to freeze. A solid cake is thus produced.

What I claim is:—

1. Ice making apparatus comprising in combination a tank, and a plurality of freezing elements therein projecting upwardly in said tank and adapted for the alternate supply to them of a refrigerating agent and of a heating agent, all of the freezing elements of said tank exteriorly surrounded on all sides by water space and adapted for the formation of ice outwardly from them, each freezing element being entirely exterior to any other or others, the space between and above said freezing elements being unobstructed, whereby the ice formed when thawed from the frozen elements, may rise by flotation.

2. Ice making apparatus comprising in combination a tank, a plurality of freezing elements therein, and a header connected to said freezing elements and having separate passages for the inflow and outflow of a refrigerating agent or of a heating agent, said freezing elements projecting upwardly from said header, all of the freezing elements of said tank exteriorly surrounded on all sides by water space and adapted for the formation of ice outwardly from them, each freezing element being entirely exterior to any other or others.

3. Ice making apparatus comprising in combination a tank, a plurality of freezing elements therein, and a header connected to said freezing elements and having an internal longitudinal partition dividing said header into separate passages for the inflow and outflow of a refrigerating agent or of a heating agent, said freezing elements projecting upwardly from said header, all of the freezing elements of said tank exteriorly surrounded on all sides by water space and adapted for the formation of ice outwardly from them, each freezing element being entirely exterior to any other or others.

4. Ice making apparatus comprising in combination a tank, a plurality of freezing elements therein, each comprising inner and outer tubes, and a header having separate passages for the inflow and outflow of a refrigerating agent or of a heating agent, the outer tube of each such freezing element connected to one of said passages and the inner tube of such freezing element connected to the other of said passages, all the freezing elements of said tank exteriorly surrounded on all sides by water space and adapted for the formation of ice outwardly from them, each freezing element being entirely exterior to any other or others.

5. Ice making apparatus comprising in combination a tank, a plurality of freezing elements therein, and a header connected to said freezing elements, said header adapted to supply to said freezing elements a refrigerating agent or a heating agent, and surrounded by insulating material, said freezing elements exteriorly surrounded on all sides by water space and adapted for the formation of ice outwardly from them, each freezing element being entirely exterior to any other or others.

In testimony whereof I have signed my name to this specification in the presence of two subscribing witnesses.

GARDNER T. VOORHEES.

Witnesses:
C. D. STARR,
F. M. WEAKLEY.